United States Patent
Merkin

(10) Patent No.: US 6,772,330 B2
(45) Date of Patent: Aug. 3, 2004

(54) SYSTEM AND METHOD FOR STORING COMPONENT INFORMATION AND A PROGRAM IN A HIDDEN PARTITION, AND LOADING THE COMPONENT INFORMATION TO A RESERVED PORTION OF THE MEMORY USING THE PROGRAM

(75) Inventor: Cynthia M. Merkin, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 637 days.

(21) Appl. No.: 09/770,133

(22) Filed: Jan. 26, 2001

(65) Prior Publication Data

US 2002/0103997 A1 Aug. 1, 2002

(51) Int. Cl.[7] .................. G06F 15/177; G06F 9/00; G06F 9/24; G06F 12/14

(52) U.S. Cl. .................. 713/2; 713/1; 713/200; 711/170; 711/171

(58) Field of Search .................. 713/2, 200, 300; 710/15, 18; 714/27, 36; 702/186; 711/173, 170, 172

(56) References Cited

U.S. PATENT DOCUMENTS

| | | | |
|---|---|---|---|
| 5,754,853 A | | 5/1998 | Pearce |
| 5,787,491 A | | 7/1998 | Merkin et al. |
| 5,826,012 A | * | 10/1998 | Lettvin .................. 713/200 |
| 5,864,698 A | * | 1/1999 | Krau et al. .................. 713/2 |
| 5,915,265 A | * | 6/1999 | Crocker et al. .............. 711/170 |
| 5,944,820 A | | 8/1999 | Beelitz |
| 5,974,567 A | * | 10/1999 | Dickson et al. ................ 714/27 |
| 6,032,239 A | | 2/2000 | Beelitz |
| 6,041,395 A | | 3/2000 | Beelitz |
| 6,487,656 B1 | * | 11/2002 | Kim et al. .................. 713/2 |
| 6,519,659 B1 | * | 2/2003 | Stevens .................. 710/15 |
| 6,594,757 B1 | * | 7/2003 | Martinez .................. 713/2 |
| 2003/0135350 A1 | * | 7/2003 | Cheston et al. .............. 702/186 |

* cited by examiner

Primary Examiner—Thomas Lee
Assistant Examiner—Chi Whan Chung
(74) Attorney, Agent, or Firm—Haynes and Boone, LLP

(57) ABSTRACT

A computer system that includes a program and component information stored in a hidden partition on a hard disk drive of the computer system such that the program is configured to cause the computer system to store the component information into a portion of a memory, create a first table associated with the information, store the first table into the portion of the memory, and notify the system firmware of the first table and the portion of the memory.

22 Claims, 3 Drawing Sheets

SYSTEM AND METHOD FOR STORING COMPONENT INFORMATION AND A PROGRAM IN A HIDDEN PARTITION, AND LOADING THE COMPONENT INFORMATION TO A RESERVED PORTION OF THE MEMORY USING THE PROGRAM

BACKGROUND

The disclosures herein relate generally to computer systems and more particularly to a system and method for delivering component instrumentation in a computer system.

In manufacturing computer systems, a revision to a system's component instrumentation, i.e. the system's low-level system management support, may be necessary each time a new system management feature is added to the system. The revision may be necessary even where the feature is display-only at the operating system level.

One way to revise a system's component instrumentation when a new feature is added may be to include information associated with the new feature in a non-volatile memory along with a system firmware. Unfortunately, the non-volatile memory that stores the system firmware may not be large enough to accommodate the amount of component information associated with the new feature.

It would be desirable to be able to add new system management features to a computer system without expanding the size of a non-volatile memory. Therefore, what is needed is a system and method for delivering component instrumentation in a computer system.

SUMMARY

One embodiment, accordingly, provides a computer system that includes a program and component information stored in a hidden partition on a hard disk drive of the computer system. The program is configured to cause the computer system to store the component information into a portion of a memory, create a first table associated with the information, store the first table into the portion of the memory, and notify the system firmware of the first table and the portion of the memory.

A principal advantage of this embodiment is that it allows component information to be delivered in a computer system. By delivering component information, system management features may be added or modified with minimal cost to the computer system. The component information may be stored in existing memory locations in a computer system without the need to add additional non-volatile memory.

DETAILED DESCRIPTION

Figure 1:
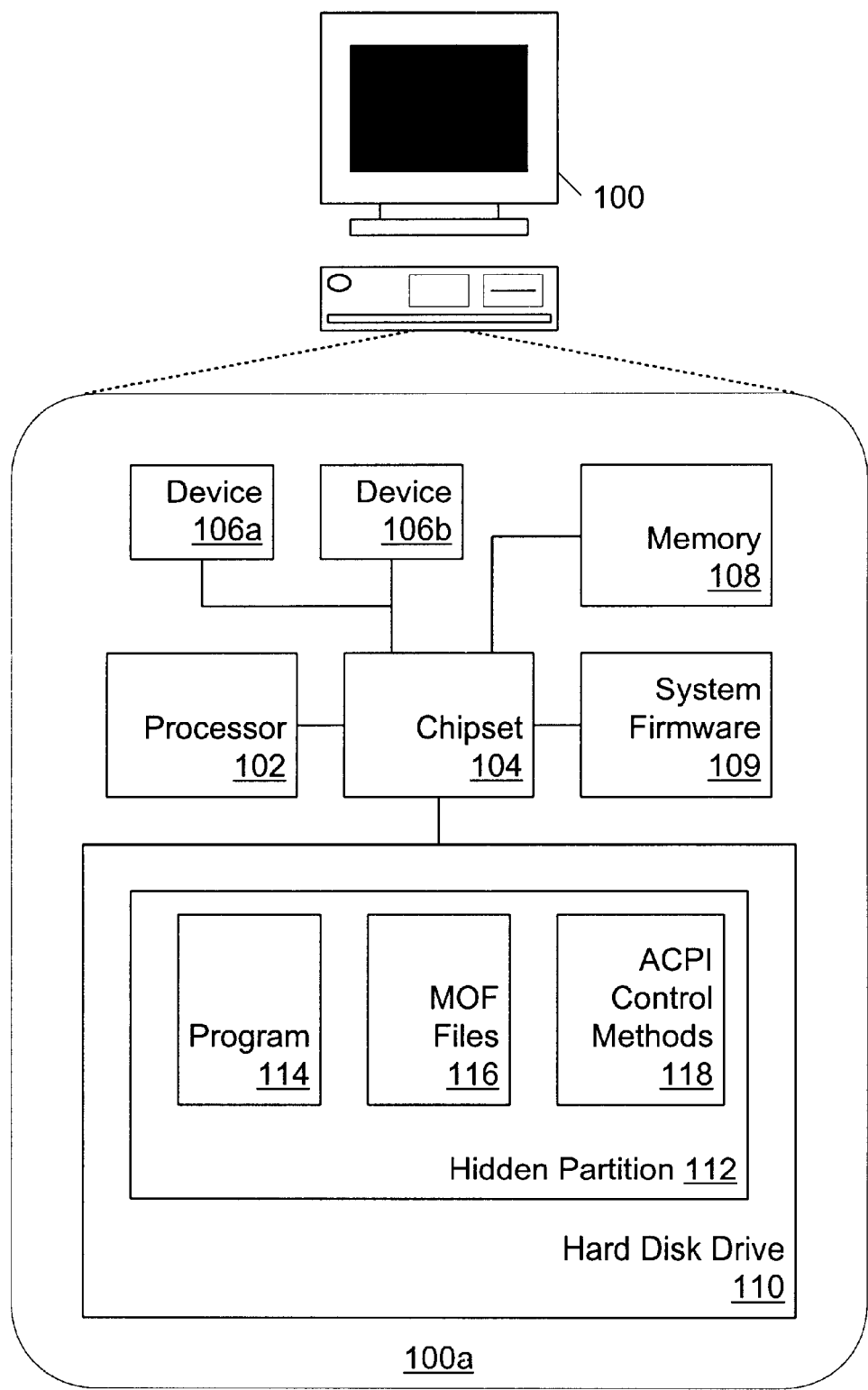
FIG. 1 is a diagram illustrating an embodiment of a computer system.

FIG. 1 is a diagram illustrating an embodiment of a computer system 100. As shown in an expanded view 100a, computer system 100 includes a processor 102, a chipset 104, a plurality of devices 106a and 106b, a memory 108, a hard disk drive 110, and a system firmware 109. In the embodiment of FIG. 1, system firmware 109 is stored on a non-volatile memory such as a flash memory.

In FIG. 1, hard disk drive 110 includes a hidden partition 112. In one embodiment, hidden partition 112 is the system partition of the manufacturer of computer system 100. In another embodiment, hidden partition 112 is created on an ATA/ATAPI-4 hard disk that supports the SETMAX command by implementing a PARTIES drive, i.e. a truly hidden partition. Additional information about ATA/ATAPI-4 hard disks may be found in the AT Attachment-4 with Packet Interface Extension Specification available from the American National Standards Institute, http://www.ansi.org/. and is incorporated by reference herein. In other embodiments, hidden partition 112 may be created in other ways.

Hidden partition 112 is configured to store program 114, one or more managed object format (MOF) files 116, and one or more advanced configuration and power interface (ACPI) control methods 118. Additional information about the managed object format may be found in the Common Information Model (CIM) Specification available from Distributed Management Task Force, Inc., http://www.dmtf.org/spec/cims.html, and incorporated by reference herein. Additional information about advanced configuration and power interface (ACPI) control methods may be found in the Advanced Configuration and Power Interface Specification available at http://www.teleport.com/~acpi/ and incorporated by reference herein.

In the embodiment of FIG. 1, MOF files 116 and ACPI control methods 118 comprise component information. As used herein, the term component information refers to system-specific descriptions and/or software associated with a low-level component or feature of a computer system. In other embodiments, component information may be stored in other formats.

Computer system 100 is configured to deliver the component information, i.e. MOE files 116 and ACPI control methods 118. Computer system 100 boots using system firmware 109. System firmware 109 may be a basic input output system (BIOS) or other software configured to initialize computer system 100 in response to computer system 100 being powered up or reset. To deliver the component information, system firmware 109 is set to force the first boot target to be hidden partition 112.

Figure 2:
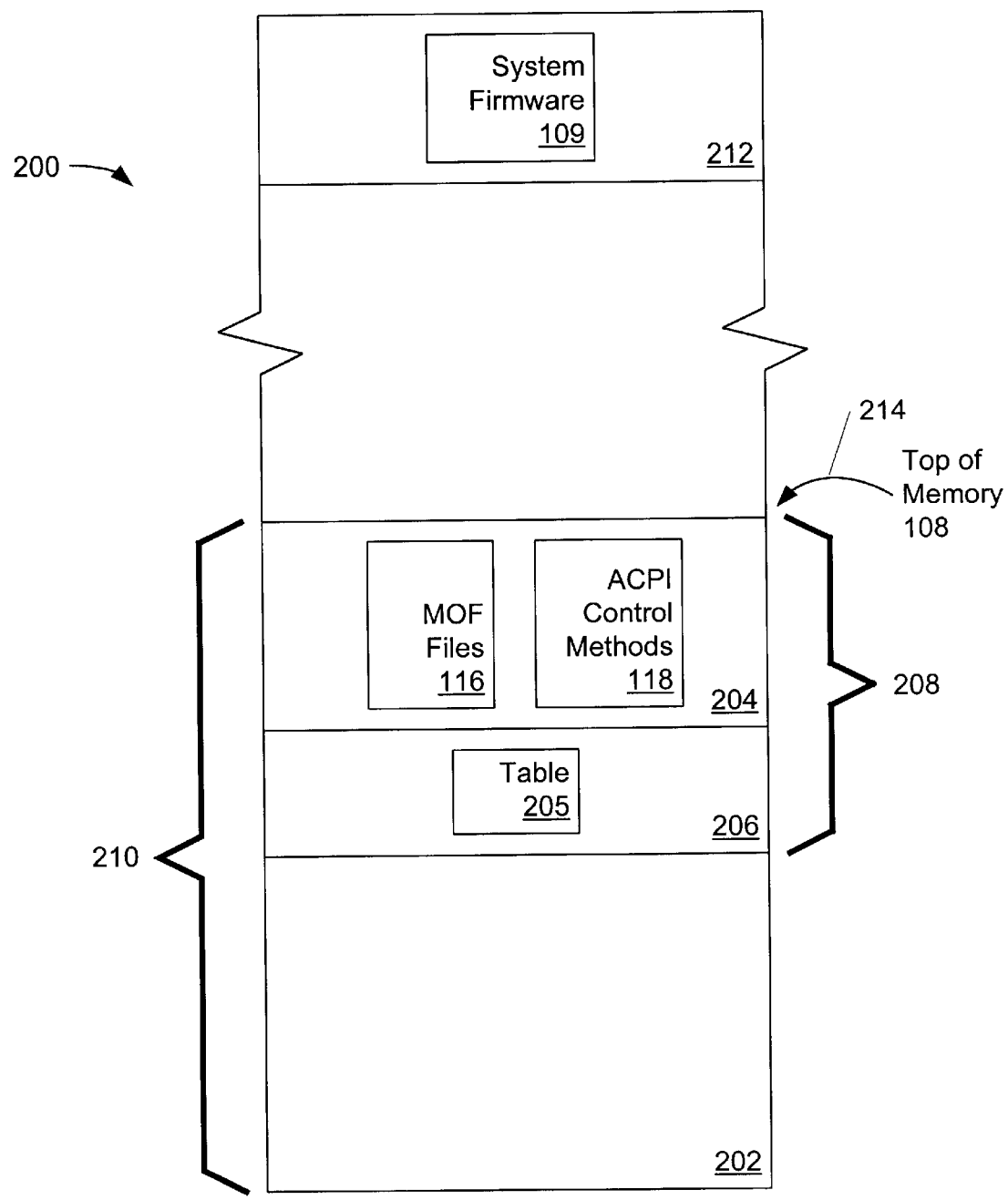
FIG. 2 is a diagram illustrating an embodiment of a memory model.

In response to booting computer system 100, system firmware 109 causes hidden partition 112 to be booted to cause program 114 stored in hidden partition 112 to be initiated. Program 114 includes instructions that cause computer system 100 to load the component information in a known portion of memory 108. In one embodiment, program 114 causes computer system 100 to load the component information into the top of memory 108. FIG. 2 is a diagram illustrating an embodiment of a memory model 200 which includes memory 108 and a memory portion 212 for storing system firmware 109. As shown in FIG. 2, program 114 causes computer system 100 to load MOF files 116 and ACPI control methods 118 into memory portion 204. Memory portion 204 is the top of memory 108 as indicated by an arrow 214. In contrast, a memory portion 202 forms the lower portion of memory 108.

Program 114 also causes computer system 100 to create a table 205 associated with the component information. In one embodiment, table 205 is a secondary system description table (SSDT) as defined by the Advanced Configuration and Power Interface Specification incorporated by reference above. In other embodiments, table 205 may be defined by other formats. Table 205 is stored in memory portion 206 as shown in FIG. 2 and includes information to describe the component information to the operating system.

After program 114 causes table 205 to be created, program 114 causes computer system 100 to notify system firmware 109 to report a memory portion 208, which includes memory portion 204 and memory portion 206, as ACPI reclaim or reserved memory to the operating system to prevent the operating system from overwriting memory portion 208 with other information. Accordingly, system firmware 109 causes memory portion 208 to be designated as reserved and causes the memory size that it will report to the operating system to be modified. Program 114 also causes computer system 100 to notify system firmware 109 to report the presence of table 205 to the operating system. In one embodiment, system firmware 109 adds an entry associated with table 205 to another table (not shown) that will be reported to the operating system. In one particular embodiment where table 205 is an SSDT table, system firmware 109 causes an entry associated with table 205 to be included into computer system 100's ACPI root system description table (RSDT) or extended root system description table (XSDT) table. After program 114 causes this information to be passed to system firmware 109, program 114 causes control of computer system 100 to be returned to system firmware 109.

After system firmware 109 regains control of computer system 100 from program 114, system firmware 109 causes computer system 100 to initiate the operating system. In the process of initiating the operating system, system firmware 109 causes computer system 100 to report memory portion 208 as ACPI reclaim or reserved memory to the operating system. System firmware 109 also causes computer system to notify the operating system of the presence of table 205.

In response to being initiated, the operating system prevents memory portion 208 from being overwritten and detects the presence of table 205. The operating system causes computer system 100 to load information associated with table 205 and the component information. The operating system may then access the component information.

In one particular embodiment where table 205 is an SSDT table, the operating system loads the SSDT information into the ACPI namespace using the RSDT or XSDT. The operating system then accesses the component information using table 205 and the RSDT or XSDT.

Although shown as being stored on hard disk drive 110 in FIG. 1, program 114 as well as the component information may be copied from a server computer or from a portable storage apparatus such as a floppy disk or a CD-ROM to computer system 100 during the manufacturing process.

Figure 3:
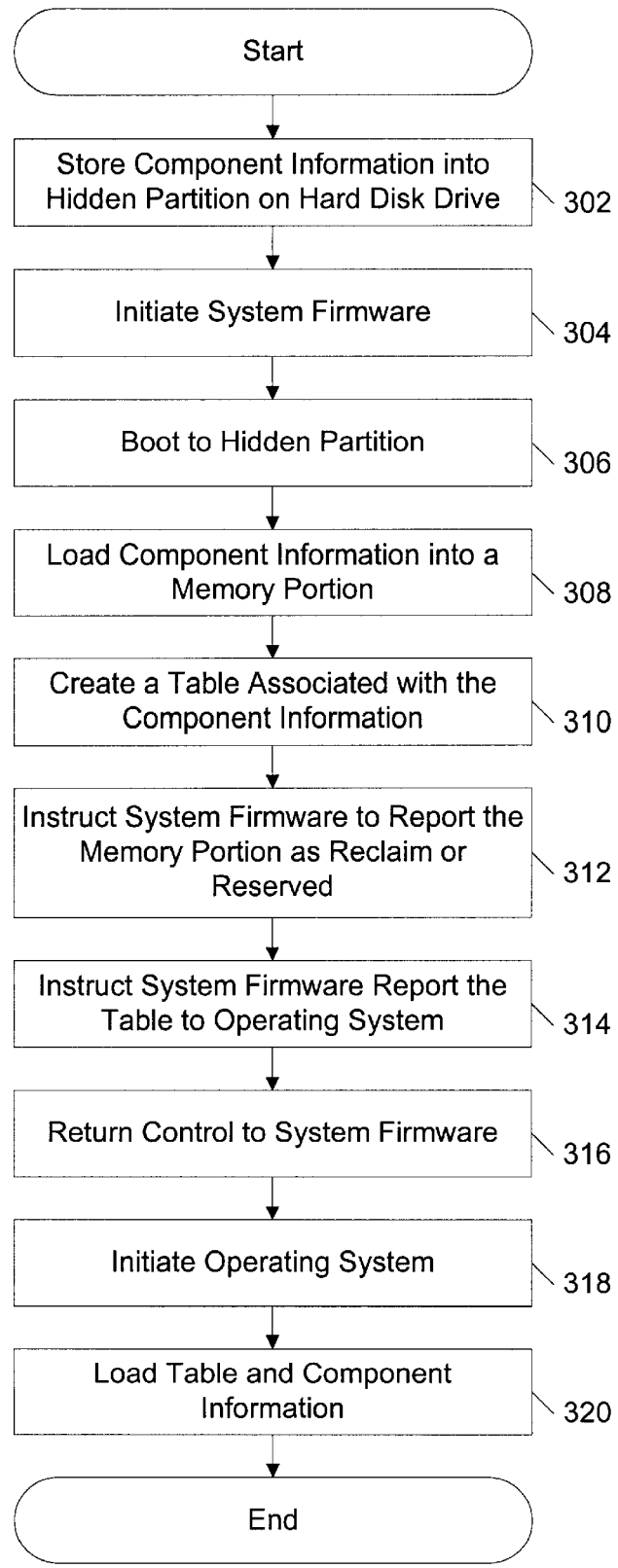
FIG. 3 is a flowchart illustrating an embodiment of a method for delivering component instrumentation in a computer system.

FIG. 3 is a flowchart illustrating an embodiment of a method for delivering component instrumentation in a computer system. In FIG. 3, component information is stored into a hidden partition on a hard disk drive as indicated in step 302. System firmware is initiated as indicated in step 304. The system firmware causes the computer system to boot to the hidden partition as indicated in step 306. The component information is loaded into a memory portion as indicated in step 308. In one embodiment, the component information is loaded into a top portion of memory as described above. In other embodiments, the component information may be loaded into other portions of memory.

A table associated with the component information is created as indicated in step 310. The system firmware is instructed to report the memory portion to the operating system as reclaim or reserved memory as indicated in step 312. The system firmware is instructed to report the table to the operating system as indicated in step 314. Control is returned the system firmware as indicated in step 316. The operating system is initiated as indicated in step 318. The table and component information are loaded as indicated in step 320.

As can be seen, the principal advantages of these embodiments are that they allow component information to be delivered in a computer system. By delivering component information, system management features may be added or modified with minimal cost to the computer system. The component information may be stored in existing memory locations in a computer system without the need to add additional non-volatile memory.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system comprising:
   a computer system including:
      a processor;
      a memory;
      a hard disk drive including a hidden partition having a program stored therein;
      a system firmware being set to cause the computer system to boot to the hidden partition to cause the program stored in the hidden partition to be initiated; and
      component information stored in the hidden partition; the program configured to cause the computer system to:
      load the component information into a portion of the memory;
      create a first table associated with the information;
      store the first table into the portion of the memory;
      designate the portion of the memory as reserved;
      modify the memory size; and
      notify the system firmware of the first table and the portion of the memory.

2. The system of claim 1, wherein the system firmware is configured to cause the computer system to initiate the program.

3. The system of claim 1, wherein the system firmware is configured to cause the computer system to boot to the hidden partition.

4. The system of claim 1, wherein the component information includes a managed object format (MOE) file and at least one advanced configuration and power interface (ACPI) control method.

5. The system of claim 1, wherein the component information includes a system-specific feature description.

6. The system of claim 1, wherein the system firmware is configured to cause the computer system to:
   create an entry associated with the first table in a second table.

7. The system of claim 6, wherein the first table is a secondary system description table (SSDT), and wherein the second table is either a root system description table (RSDT) or an extended root system description table (XSDT).

8. The system of claim 6, wherein the system firmware is configured to cause the computer system to:
   initiate an operating system, the operating system configured to access the component information using the first table and the second table.

9. A method performed by a computer system comprising:

storing a program and component information into a hidden partition on a hard disk drive;

providing a system firmware set to cause the computer system to boot to the hidden partition to cause the program to be initiated; and initiating a program configured to cause the computer system to:
  load the component information into a portion of a memory;
  create a first table associated with the information;
  store the first table into the portion of the memory;
  designate the portion of the memory as reserved;
  modify the memory size; and
  notify a system firmware of the first table and the portion of the memory.

10. The method of claim 9, further comprising:

initiating a system firmware configured to cause the computer system to initiate the program.

11. The method of claim 9, further comprising:

initiating a system firmware configured to cause the computer system to boot to the hidden partition.

12. The method of claim 9, wherein the component information includes a managed object format (MOF) file and at least one advanced configuration and power interface (ACPI) control method.

13. The method of claim 9, wherein the component information includes a system-specific feature description.

14. The method of claim 9, further comprising:

initiating a system firmware configured to cause the computer system to:

create an entry associated with the first table in a second table.

15. The method of claim 14, wherein the first table is a secondary system description table (SSDT), and wherein the second table is either a root system description table (RSDT) or an extended root system description table (XSDT).

16. The method of claim 14, further comprising:

initiating an operating system configured to access the component information using the first table and the second table.

17. A computer program product comprising:

a computer program processable by a computer system for causing the computer system to:
  access component information stored in a hidden partition on a hard disk drive;
  load the component information into a portion of a memory;
  create a first table associated with the information;
  store the first table into the portion of the memory;
  designate the portion of the memory as reserved;
  modify the memory size; and
  notify a system firmware of the first table and the portion of the memory; and a storage apparatus from which the computer program is accessible by the computer system.

18. The computer program product of claim 17, wherein the component information includes a managed object format (MOF) file and at least one advanced configuration and power interface (ACPI) control method.

19. The computer program product of claim 17, wherein the component information includes a system-specific feature description.

20. The computer program product of claim 17, wherein the computer program is processable by the computer system for causing the computer system to:

initiate a system firmware configured to cause the computer system to:

create an entry associated with the first table in a second table.

21. The computer program product of claim 17, wherein the first table is a secondary system description table (SSDT), and wherein the second table is either a root system description table (RSDT) or an extended root system description table (XSDT).

22. The computer program product of claim 17, wherein the computer program is processable by the computer system for causing the computer system to:

initiate the system firmware configured to cause the computer system to:

initiate an operating system configured to access the component information using the first table and the second table.

* * * * *